United States Patent
Staar et al.

(10) Patent No.: US 11,361,146 B2
(45) Date of Patent: Jun. 14, 2022

(54) MEMORY-EFFICIENT DOCUMENT PROCESSING

(71) Applicant: INTERNATIONAL BUSINESS MACHINES CORPORATION, Armonk, NY (US)

(72) Inventors: Peter Willem Jan Staar, Wädenswil (CH); Michele Dolfi, Zurich (CH); Christoph Auer, Zurich (CH); Leonidas Georgopoulos, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/811,457

(22) Filed: Mar. 6, 2020

(65) Prior Publication Data

US 2021/0279400 A1    Sep. 9, 2021

(51) Int. Cl.
*G06F 17/10* (2006.01)
*G06F 40/114* (2020.01)
(Continued)

(52) U.S. Cl.
CPC ............ *G06F 40/114* (2020.01); *G06F 16/93* (2019.01); *G06F 40/143* (2020.01);
(Continued)

(58) Field of Classification Search
CPC .... G06F 40/114; G06F 40/205; G06F 40/143; G06F 16/93; G06K 9/00463; G06K 2209/01
See application file for complete search history.

(56) References Cited

U.S. PATENT DOCUMENTS 5,021,989 A * 6/1991 Fujisawa ................. G06F 16/93
715/255
5,781,785 A * 7/1998 Rowe .................... G06F 40/131
707/999.2
(Continued)

FOREIGN PATENT DOCUMENTS

CN    101689203 B    9/2013
CN    108898137 A    11/2018
(Continued)

OTHER PUBLICATIONS

Tao, Logical Labeling of Fixed Layout PDF Documents Using Multiple Contexts, 2014 11th IAPR International Workshop on Document Analysis Systems (Year: 2014).*
(Continued)

*Primary Examiner* — Shahid K Khan
(74) *Attorney, Agent, or Firm* — Teddi E. Maranzano

(57) ABSTRACT

The invention is notably directed to a computer-implemented method for processing a plurality of documents. The method comprises providing the plurality of documents in a first format and splitting each of the plurality of documents of the first format into one or more individual pages. The method further comprises individually parsing the one or more individual pages of the plurality of documents. The parsing comprises identifying a predefined set of items of the one or more individual pages. Further processing comprises gathering the predefined set of items of each of the one or more individual pages of the plurality of documents into individual page files of a second format and performing the document processing service with the individual page files of the second format. The invention further concerns a corresponding computing system and a related computer program product.

16 Claims, 9 Drawing Sheets

(51) Int. Cl.
*G06F 16/93* (2019.01)
*G06F 40/143* (2020.01)
*G06F 40/205* (2020.01)
*G06V 30/414* (2022.01)
*G06V 30/10* (2022.01)

(52) U.S. Cl.
CPC .......... *G06F 40/205* (2020.01); *G06V 30/414* (2022.01); *G06V 30/10* (2022.01)

(56) References Cited

U.S. PATENT DOCUMENTS

| | | | | |
|---|---|---|---|---|
| 5,818,966 | A * | 10/1998 | Prasad | G06K 15/02 382/164 |
| 6,401,097 | B1 * | 6/2002 | McCotter | G06F 16/93 715/764 |
| 6,981,209 | B1 * | 12/2005 | Parikh | G06F 40/143 707/999.101 |
| 10,089,742 | B1 | 10/2018 | Lin et al. | |
| 10,210,178 | B2 | 2/2019 | Souche et al. | |
| 2004/0006742 | A1 * | 1/2004 | Slocombe | G06F 40/157 715/201 |
| 2004/0034455 | A1 * | 2/2004 | Simonds | G01C 21/3608 701/1 |
| 2005/0053283 | A1 * | 3/2005 | Wakeam | G06V 30/32 382/186 |
| 2006/0200752 | A1 * | 9/2006 | Sellers | G06F 40/114 715/209 |
| 2006/0236237 | A1 * | 10/2006 | Peiro | G06F 40/103 382/173 |
| 2007/0168382 | A1 * | 7/2007 | Tillberg | G06F 16/93 707/E17.084 |
| 2008/0168342 | A1 * | 7/2008 | Shur | G06F 40/131 715/229 |
| 2008/0317343 | A1 * | 12/2008 | Ferman | G06V 30/1463 382/176 |
| 2009/0019011 | A1 * | 1/2009 | Lee | G06F 16/951 |
| 2009/0110268 | A1 * | 4/2009 | Dejean | G06V 30/416 382/159 |
| 2010/0131614 | A1 * | 5/2010 | Bremer, Jr. | G06F 16/93 709/218 |
| 2014/0006982 | A1 * | 1/2014 | Wabyick | G06F 40/106 715/804 |
| 2014/0013215 | A1 * | 1/2014 | Sesum | G06F 40/106 715/247 |
| 2014/0314319 | A1 | 10/2014 | Hamel | |
| 2014/0376804 | A1 | 12/2014 | Akata | |
| 2015/0199314 | A1 * | 7/2015 | Ratnakar | G06F 40/143 715/255 |
| 2015/0199821 | A1 * | 7/2015 | Lyubarskiy | G06K 17/00 382/173 |
| 2015/0262007 | A1 * | 9/2015 | Sesum | G06K 9/6261 382/177 |
| 2018/0075368 | A1 | 3/2018 | Brennan | |
| 2018/0097812 | A1 * | 4/2018 | Gillett | G06F 16/9535 |
| 2018/0101726 | A1 | 4/2018 | Wang et al. | |
| 2018/0300323 | A1 * | 10/2018 | Lee | G06F 16/93 |
| 2018/0365248 | A1 | 12/2018 | Zheng | |
| 2019/0102674 | A1 | 4/2019 | Kwant et al. | |
| 2019/0302997 | A1 * | 10/2019 | Kouda | G06F 3/04817 |
| 2019/0385059 | A1 | 12/2019 | Huang | |
| 2020/0005154 | A1 | 1/2020 | Herbster | |
| 2020/0045354 | A1 | 2/2020 | Gao | |
| 2020/0294187 | A1 * | 9/2020 | Staar | G06V 10/225 |
| 2021/0279516 | A1 | 9/2021 | Staar | |
| 2021/0279532 | A1 | 9/2021 | Staar | |
| 2021/0279636 | A1 | 9/2021 | Staar | |

FOREIGN PATENT DOCUMENTS

| | | |
|---|---|---|
| CN | 110110258 A | 8/2019 |
| CN | 110188189 A | 8/2019 |
| JP | 08227422 A | 9/1996 |
| JP | 2006031129 A | 2/2006 |
| WO | 2018213205 A1 | 11/2018 |

OTHER PUBLICATIONS

Mell et al., "The NIST Definition of Cloud Computing", Recommendations of the National Institute of Standards and Technology, NIST Special Publication 800-145, Sep. 2011, 7 pages.

Ahmed et al., "A Generic Method for Automatic Ground Truth Generation of Camera-Captured Documents", arXiv:1605.01189v1, May 4, 2016, pp. 1-15.

Moll et al., "Truthing for Pixel-Accurate Segmentation", The Eighth IAPR International Workshop on Document Analysis Systems, Sep. 16-19, 2008, pp. 379-385.

Schulman, "Recognizing and Generating Natural Language Referring Expressions in Images", Thesis Submitted in Partial Fulfillment of the Requirements for the Master of Sciences Degree Under the Supervision of: Prof. Michael Elhadad, Ben—Gurion University of the Negev, Aug. 21, 2018, 72 pages.

Kahou et al., "FigureQA: An Annotated Figure Dataset for Visual Reasoning", Workshop Track—ICLR 2018, arXiv:1710.07300v2, Feb. 22, 2018, pp. 1-20.

Konyushkova et al., "Discovering General-Purpose Active Learning Strategies", arXiv:1810.04114v2, Apr. 2, 2019, pp. 1-10.

IBM: List of IBM Patents or Patent Applications Treated as Related (Appendix P), Mar. 12, 2020, pp. 1-2.

Pending U.S. Appl. No. 16/811,473, filed Mar. 6, 2019, entitled: "Ground Truth Generation for Image Segmentation", 35 pages.

Pending U.S. Appl. No. 16/811,490, filed Mar. 6, 2019, entitled: "Digital Image Processing", 38 pages.

Pending U.S. Appl. No. 16/811,421, filed Mar. 6, 2019, entitled: "Efficient Ground Truth Annotation", 35 pages.

International Searching Authority, "Notification of Transmittal of the international Search Report and the Written Opinion of the International Searching Authority, or Declaration," Patent Cooperation Treaty, Apr. 29, 2021, 7 pages, International Application No. PCT/IB2021/050612.

International Searching Authority, "Notification of Transmittal of the international Search Report and the Written Opinion of the International Searching Authority, or Declaration," Patent Cooperation Treaty, May 7, 2021, 7 pages, International Application No. PCT/IB2021/050648.

\* cited by examiner

| | |
|---|---|
| 651 | text cell: [ { ($x_0$, $y_0$), ($x_1$, $y_1$), text = "Text1"}] |
| 652 | text cell: [ { ($x_0$, $y_0$), ($x_1$, $y_1$), text = "Text2"}] |
| 653 | text cell: [ { ($x_0$, $y_0$), ($x_1$, $y_1$), text = "Text3"}] |
| 654 | path: [ { ($x_0$, $y_0$), ($x_1$, $y_1$), ($x_2$, $y_2$), ($x_3$, $y_3$), color = black, width = 1.5 }] |
| 655 | bitmap: [ { ($x_0$, $y_0$), ($x_1$, $y_1$) }] |

| | |
|---|---|
| 751 | text cell: [ { (x₀, y₀), (x₁, y₁), text = "Text1"}] |
| 752 | text cell: [ { (x₀, y₀), (x₁, y₁), text = "Text2"}] |
| 753 | text cell: [ { (x₀, y₀), (x₁, y₁), text = "Text3"}] |
| 754 | path: [ { (x₀, y₀), (x₁, y₁), (x₂, y₂), (x₃, y₃), color = black, width = 1.5 }] |
| 755 | bitmap: [ { (x₀, y₀), (x₁, y₁) }] |
| 756 | text cell: [ { (x₀, y₀), (x₁, y₁), text = "Text4"}] |
| 757 | path: [ { (x₀, y₀), (x₁, y₁), color = black, width = 3 }] |

851　text cell: [ { $(x_0, y_0)$, $(x_1, y_1)$, text = "Text1"}]

852　text cell: [ { $(x_0, y_0)$, $(x_1, y_1)$, text = "Text2"}]

853　text cell: [ { $(x_0, y_0)$, $(x_1, y_1)$, text = "Text3"}]

854　path: [ { $(x_0, y_0)$, $(x_1, y_1)$, color = black, width = 1.5}]

855　path: [ { $(x_0, y_0)$, $(x_1, y_1)$, color = black, width = 1.5 }]

856　Curved path: [ { $(x_0, y_0)$, $(x_1, y_1)$, $(x_2, y_2)$, $(x_4, y_4)$, ), $(x_5, y_5)$, color = black, width = 3 }]

MEMORY-EFFICIENT DOCUMENT PROCESSING

BACKGROUND

The present invention relates to a computer-implemented method for performing a document processing service for a plurality of documents. The present invention further relates to a corresponding computing system and a corresponding computer program product.

In the era of big data, a huge number of electronic documents is available for data analysis. Such data analysis is increasingly provided as a service, e.g. as a cloud service.

Cloud computing is a model of service delivery for enabling convenient, on-demand network access to a shared pool of configurable computing resources that can be rapidly provisioned and released with minimal management effort or interaction with a provider of the service.

However, providing efficient and scalable document processing services, in particular cloud services, remains a challenge. Since the documents that need to be processed may be huge, a document processing service may require a significant amount of main memory on a single node to operate.

Accordingly, there is a need for providing and performing document processing services in an efficient way.

SUMMARY

According to an embodiment, the invention is embodied as a computer-implemented method for performing a document processing service for a plurality of documents. The method comprises providing the plurality of documents in a first format and splitting each of the plurality of documents of the first format into one or more individual pages. The method further comprises individually parsing the one or more individual pages of the plurality of documents. The parsing comprises identifying a predefined set of items of the one or more individual pages. Further processing comprises gathering the predefined set of items of each of the one or more individual pages of the plurality of documents into individual page files of a second format and performing the document processing service with the individual page files of the second format.

Such an embodied method may facilitate to perform the document processing service in an efficient way, in particular in terms of memory footprint and Input/Output (I/O)-load. More particularly, such a method allows to store and process in the second format only the basic information that is needed for a respective document processing service.

Furthermore, the page-wise or in other words per-page processing and storage may provide the advantage that the amount of data that needs to be transferred for every single processing task can be only a fraction of the full original document.

Accordingly, embodiments of the invention may effectively "normalize" both I/O and memory demand between documents of different size. In particular, it may be avoided to reserve large memory resources for the processing of large documents.

According to embodiments providing the plurality of documents in a first format comprises receiving the plurality of documents and converting the plurality of documents into the first format. According to such an embodiment, one or more of the plurality are received by the document processing service in a format that is different from the first format. According to such an embodiment the document processing service converts these documents that are not already in the first format into the first format.

According to embodiments, the document processing service may be embodied as a micro-service. Embodiments of the invention may significantly reduce the I/O-load between such micro-services working together in a processing pipeline.

According to embodiments, the document processing service may be embodied as a cloud-service. According to embodiments, the cloud resources of such a cloud service can be assigned in more smaller chunks, with less reserve capacity.

According to an embodiment, the predefined set of items comprises text cells including their text content and their bounding boxes. Such text cells may provide basic information of the individual page with a relatively low memory footprint.

According to an embodiment, the predefined set of items comprises paths including corresponding path information, the path information comprising path coordinates.

Such paths may provide basic information of the individual page with a relatively low memory footprint.

According to an embodiment, the path information comprises color information of the color of the path and/or width information of the width of the paths. This may provide valuable additional information with a relatively low memory footprint.

According to an embodiment, the predefined set of items comprises bitmap resources and their bounding boxes. According to such an embodiment, the computer-implemented method may identify the bitmap resources as such and provide the bounding box of the bitmap resource. In other words, it provides as output that the corresponding individual page comprises a bitmap within the area as defined by the bounding box. The bounding boxes may be in particular specified by the coordinates of their corners, e.g. by the coordinates of their lower left and upper right corner.

Such information about bitmap resources may provide basic information of the individual page with a relatively low memory footprint.

According to an embodiment, the computer-implemented method further comprises performing an optical character recognition on the bitmap resources, identifying text cells including their text content and their bounding boxes in the bitmap resources and identifying paths including corresponding path information in the bitmap resources. The path information comprises path coordinates.

This may provide additional valuable information of the bitmap resources with a relatively low and/or efficient memory footprint.

According to an embodiment, the first format is a cross-platform software format or in other words a platform-independent software format which may be run on multiple computing platforms.

According to an embodiment, the first format is a format according to the Portable Document Format-standard, in particular according to any version of the ISO 32000-X standard of the International Standard Association. Such a standard has been widely adopted.

According to an embodiment, the second format is a text format comprising textual information of a predefined structure.

Such text formats may be configured or adapted according to the needs of the respective document processing service. According to embodiments, the second format may be in particular configured to provide a reduction of the average and the median file size of the plurality of documents as compared with the first format. While according to embodiments the second format may be freely defined and adapted according to the needs of the document processing service, according to other embodiments existing text formats may be used as second format.

A particularly suitable text format that may be used as second format is the Java Script Object Notification Data Interchange Format (JSON-Format). According to such an embodiment any of the specifications of JSON-Format by Douglas Crockford, e.g. RFC 8259, or any specifications of the JSON-Format by ECMA, e.g. ECMA 404 or any specifications of the JSON-Format by the International Standards Association, e.g. ISO/IEC 21778:2017, may be used. According to another embodiment, the Hypertext Markup Language as developed by the Worldwide Web Consortium and as standardized in particular by ISO/IEC 15445, W3C HTML 5, 3C HTML 4.0, W3C HTML 3.2 or any further versions may be used for the second format. According to yet another embodiment, the YAML Ain't Markup Language may be used as second format.

The document processing service may be generally any kind of service that performs electronic document processing. Methods according to embodiments of the invention are particularly suited to perform ground-truth gathering, machine learning applications, document-conversion and/or language analysis as document processing service.

According to another embodiment, the invention is embodied as a computing system for performing a document processing service for a plurality of documents. The system is configured to provide the plurality of documents in a first format and split each of the plurality of documents of the first format into one or more individual pages. The system is further configured to individually parse the one or more individual pages of the plurality of documents, the parsing comprising identifying a predefined set of items of the one or more individual pages, gather the predefined set of items of each of the one or more individual pages of the plurality of documents into individual page files of a second format and to perform the document processing service with the individual page files of the second format.

According to another embodiment, the invention is embodied as computer program product for performing a document processing service for a plurality of documents by a computing system. The computer program product comprises a computer readable storage medium having program instructions embodied therewith. The program instructions are executable by the system to cause the system to perform a method comprising providing the plurality of documents in a first format, splitting each of the plurality of documents of the first format into one or more individual pages and individually parsing the one or more individual pages of the plurality of documents. The parsing comprises identifying a predefined set of items of the one or more individual pages. The method further comprises gathering the predefined set of items of each of the one or more individual pages of the plurality of documents into individual page files of a second format; and performing the document processing service with the individual page files of the second format.

Further embodiments relate to a node of a computing environment for a document processing service and a server for performing a document processing service.

Embodiments of the invention will be described in more detail below, by way of illustrative and non-limiting examples, with reference to the accompanying drawings.

BRIEF DESCRIPTION OF THE SEVERAL VIEWS OF THE DRAWINGS

FIG. 6a shows an individual page of an exemplary document of a first format;

FIG. 6b shows an example of an individual page file of a second format corresponding to the individual page of FIG. 6a;

FIG. 7a shows an individual page of another exemplary document of a first format;

FIG. 7b shows the individual page file of the second document format corresponding to the individual page of FIG. 7a;

FIG. 8a shows an individual page of another exemplary document of a first format;

FIG. 8b shows the individual page file of the second document format that corresponds to the individual page of FIG. 8a.

DETAILED DESCRIPTION

Figure 1:
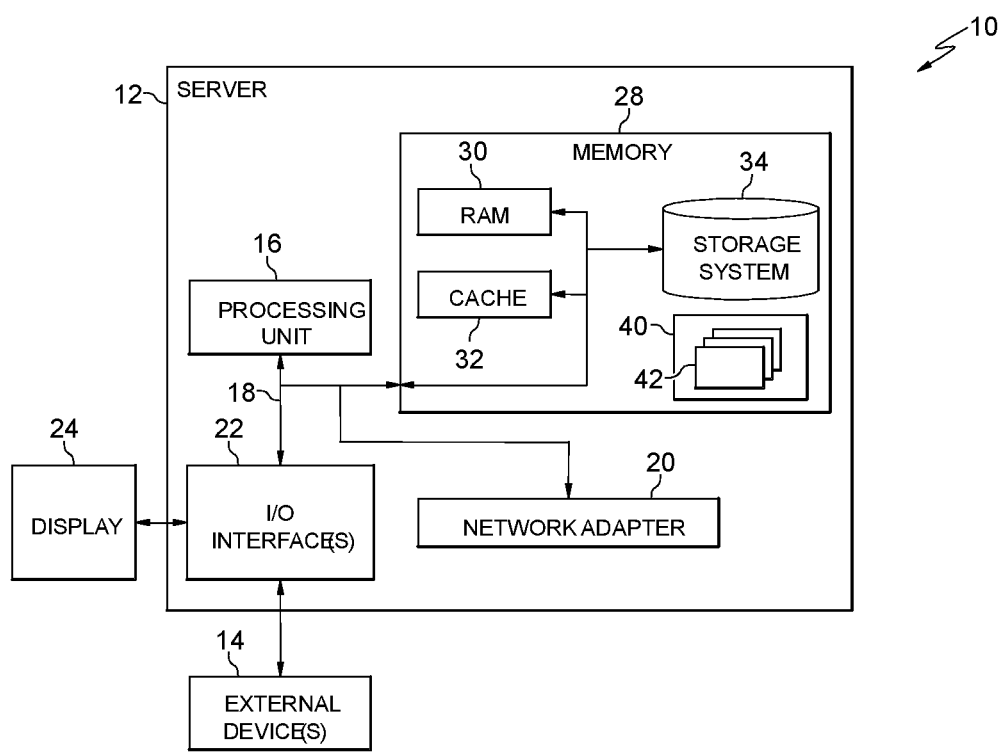
FIG. 1 depicts a cloud computing node according to an embodiment of the present invention.

In reference to FIGS. 1-9, some general terms of embodiments of the invention are described.

Programmatic documents may be defined as documents in which the fundamental components are represented by code. Such programmatic documents include e.g. documents in the Portable Document Format (PDF) or in Microsoft-Word format. A programmatic document may be generally defined as a document which is of the nature of or according to a program, schedule, or method.

Bitmap documents or bitmap resources within programmatic documents are documents or resources where the fundamental components are represented by colored pixels in an image. This includes e.g. documents in Portable Networks Graphic (png), Joint Photographics Expert Group (JPEG) or Tagged Image File Format (TIFF) format.

The term ground truth may generally refer to information provided by direct observation (i.e. empirical evidence) as opposed to information provided by inference. In the field of image analysis, it may refer in particular to the correct identity, position, size and coordinates of the individual symbols, e.g. the characters, as well as of text cells comprising words, paragraphs or titles and other layout information such as information on paths and bitmap resources.

The position and layout of text cells as well as of bitmap resources may be represented by bounding boxes. While generally bounding boxes may be character bounding boxes of the individual characters of a respective electronic document, according to embodiments of the present invention the term bounding box shall in particular refer to more global bounding boxes or in other words layout bounding boxes of the layout of the documents to be processed. This includes in particular bounding boxes which demarcate text cells comprising words, paragraphs, titles or footnotes of the electronic document as well as bounding boxes of bitmap resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a server 12, which is operational with numerous computing system environments or configurations. Examples of computing systems, environments, and/or configurations that may be suitable for use with server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Server 12 may be described in the general context of computer system-executable instructions, such as program modules, being executed by a computer system. Generally, program modules may include routines, programs, objects, components, logic, data structures, and so on that perform particular tasks or implement particular abstract data types. Server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, server 12 in cloud computing node 10 is shown in the form of a general-purpose computing device. The components of server 12 may include, but are not limited to, one or more processors or processing unit(s) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 12 typically includes a variety of computer system readable media. Such media may be any available media that is accessible by server 12, and it includes both volatile and non-volatile media, removable and non-removable media.

System memory 28 can include computer system readable media in the form of volatile memory, such as random access memory (RAM) 30 and/or cache memory 32. Server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Server 12 may also communicate with one or more external devices 14 such as a keyboard, a pointing device, a display 24, etc.; one or more devices that enable a user to interact with server 12; and/or any devices (e.g., network card, modem, etc.) that enable server 12 to communicate with one or more other computing devices. Such communication can occur via Input/Output (I/O) interfaces 22. Still yet, server 12 can communicate with one or more networks such as a local area network (LAN), a general wide area network (WAN), and/or a public network (e.g., the Internet) via network adapter 20. As depicted, network adapter 20 communicates with the other components of server 12 via bus 18. It should be understood that although not shown, other hardware and/or software components could be used in conjunction with server 12. Examples, include, but are not limited to: microcode, device drivers, redundant processing units, external disk drive arrays, RAID systems, tape drives, and data archival storage systems, etc.

Figure 2:
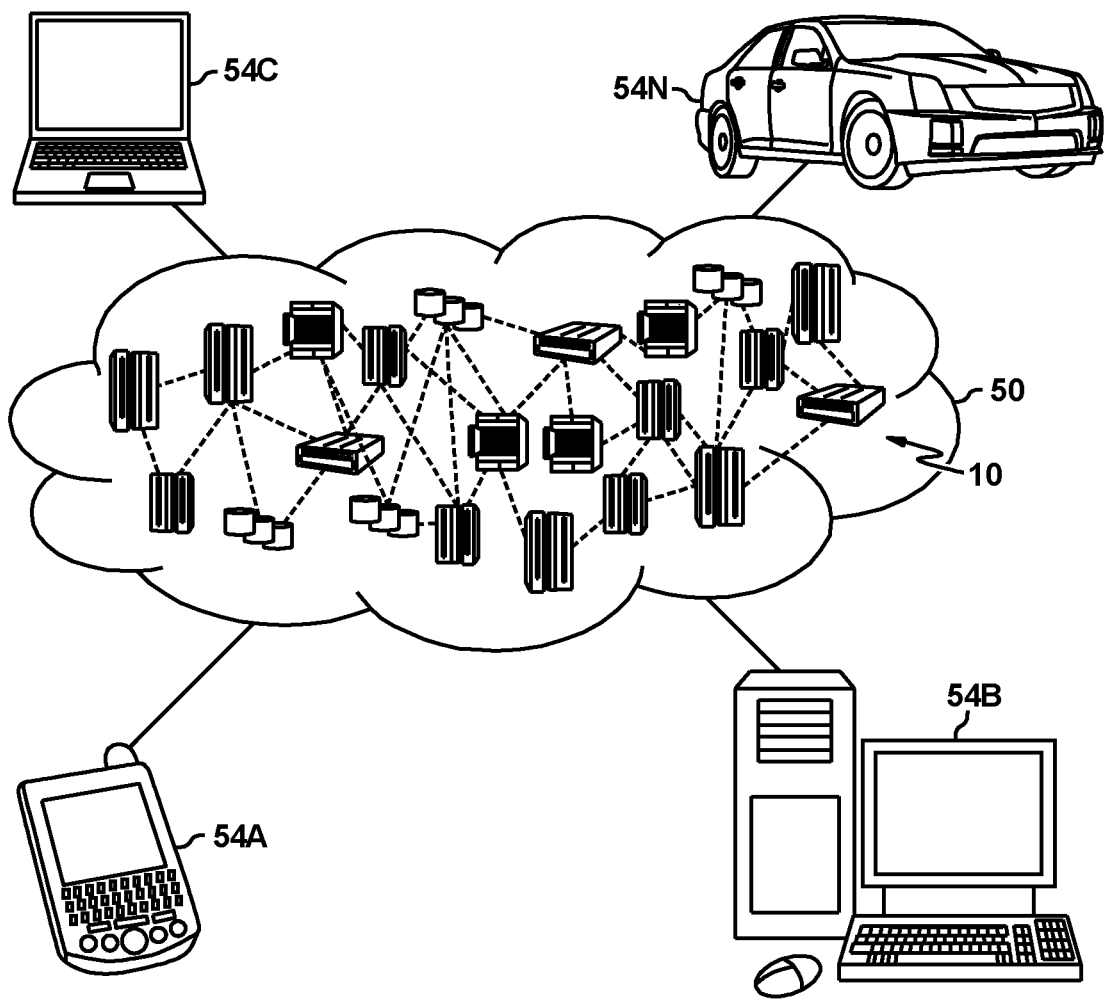
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local user devices used by cloud consumers, such as, for example, personal digital assistant (PDA) or cellular telephone 54A, desktop computer 54B, laptop computer 54C, and/or automobile computer system MN may communicate. The user devices 54A, 54B, 54C and 54N may in the following be also generally referred to as user devices 54. The user devices 54 may belong to the same user or a user group. User devices 54 that belong to the same user or a user group are referred to as set 55 of user devices 54. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
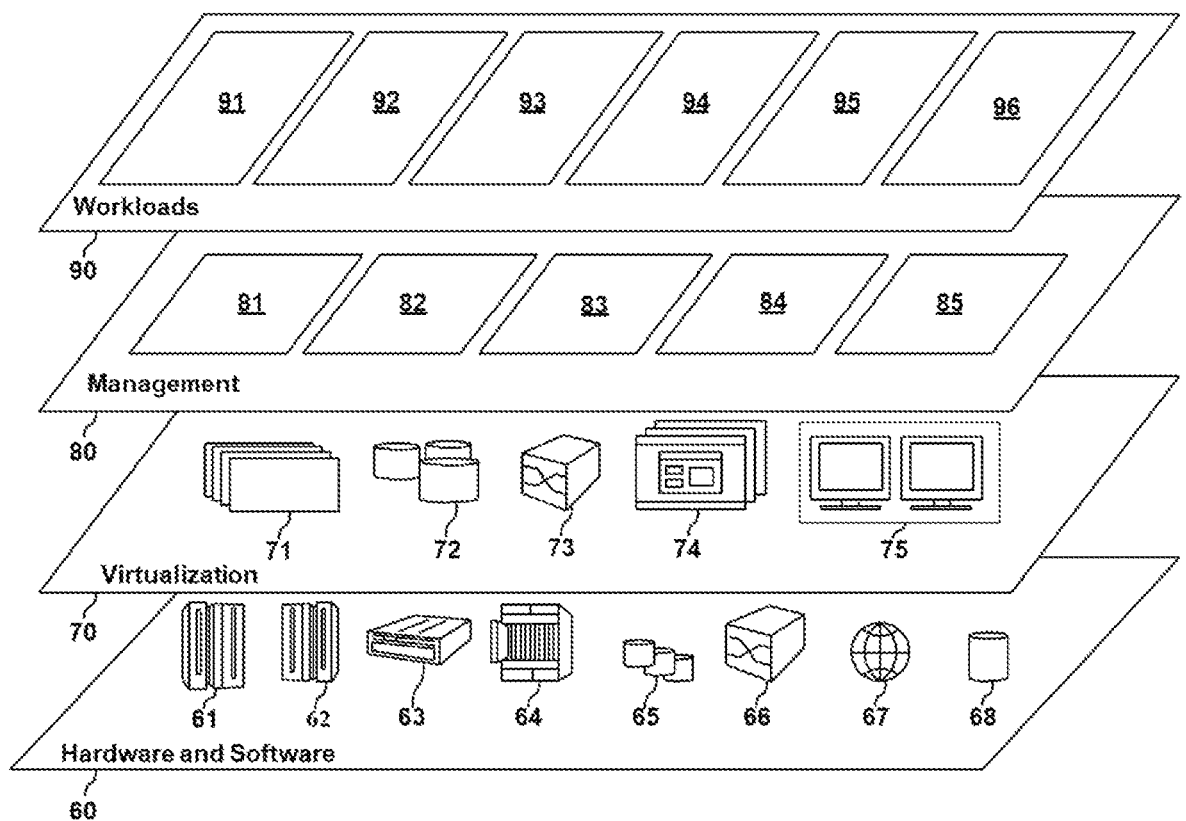
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing and performing document processing services 96.

Figure 4:
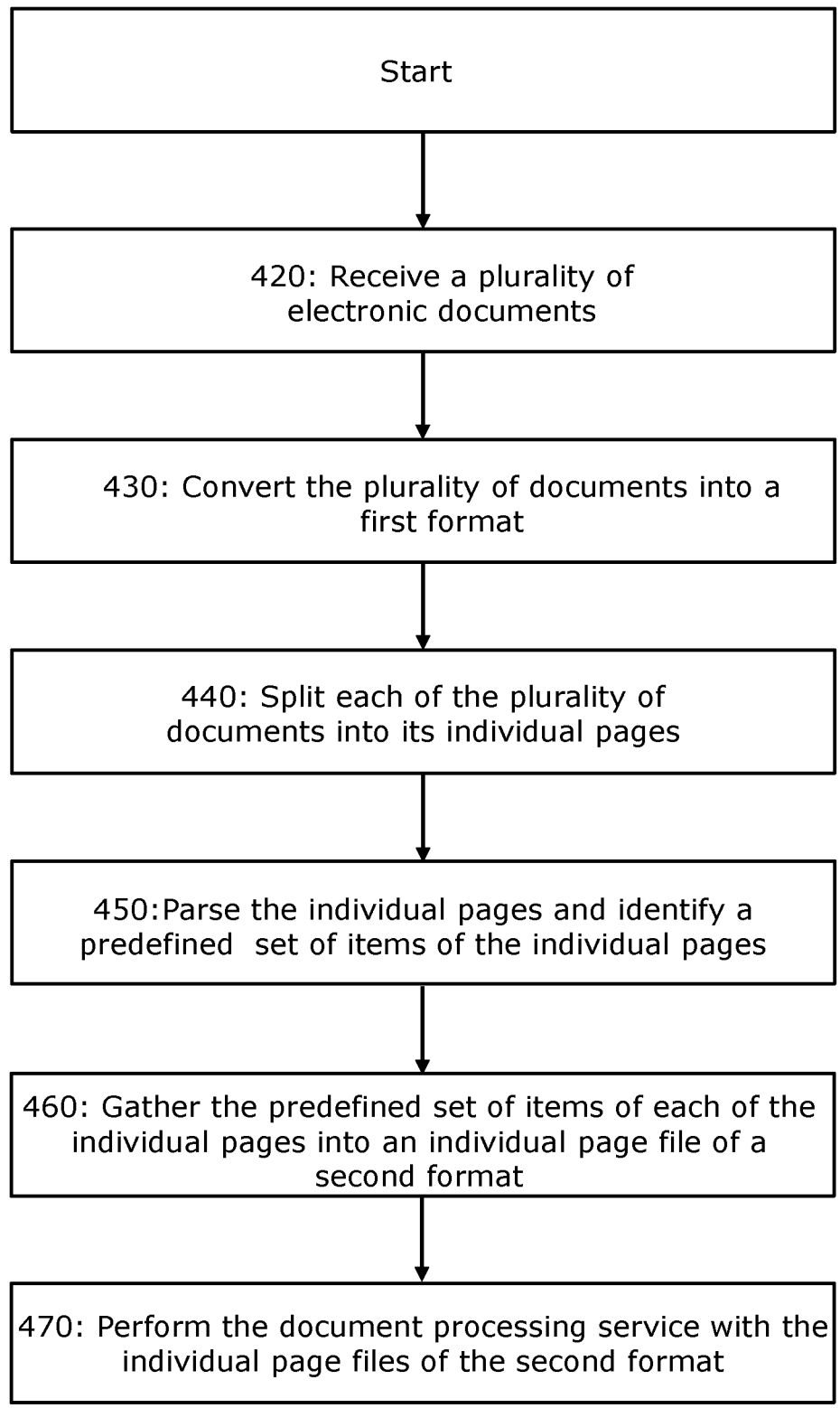
FIG. 4 shows a flow chart of a computer-implemented method for performing a document processing service for a plurality of documents.

FIG. 4 shows a flow chart 400 of a computer-implemented method for performing a document processing service for a plurality of documents. The method may be performed e.g. by the cloud computing node 10 as shown in FIG. 1 and accordingly the flow chart 400 will be explained in the following with reference to the components of the cloud computing node 10. The cloud computing node 10 may in the following also be denoted just as node 10 or network node 10.

At block 420, the node 10 receives a plurality of documents. The node 10 is provided to perform a document processing service for the plurality of received documents. The plurality of received documents may generally comprise any kind of electronic documents in any kind of electronic format. The plurality of received documents may also have different electronic formats according to embodiments.

At block 430, the node 10 converts the plurality of documents into a first format. This may be done e.g. by standard document format conversion programs. The standard document format conversion programs may be stored e.g. in the memory 28 of node 10 as program modules 42. It should be noted that of course block 430 needs to be performed only for documents that have been received in an initial format that is not the first format. For documents that have been received already in the first format, a conversion into the first format is not necessary.

The first format may be in particular a cross-platform software format, i.e. a format that is independent of application software, hardware and operating systems.

According to an embodiment, the first format may be a format according to the Portable Document Format-standard (PDF-standard), in particular according to any version of the ISO 32000-X standard of the International Standard Association. Such a document will be in the following denoted as PDF-document. The PDF-standard provides the particular advantage that it is widely used and that PDF-converters are available for most available document formats. As a result of block 430, the plurality of documents are all provided in the first format, in particular in the PDF-format.

At block 440, each of the plurality of documents of the first format is split into one or more individual pages. More particularly, if a respective document of the first format comprises only one page, then there is no need to split it further and it will be kept as single-page document. But if a document of the first format comprises two or more pages, it will be split into the two or more individual pages.

At block 450, the one or more individual pages of the plurality of documents are individually parsed. In other words, the one or more individual pages are parsed per page or page by page. The parsing comprises in particular identifying a predefined set of items of the one or more individual pages. The predefined set of items may generally comprise any items that are of particular interest for the document processing service to be performed. According to some embodiments, the predefined set of items may be defined in dependence on the respective processing service that shall be performed for the plurality of documents. According to some embodiments the predefined set of items may comprise only basic items of the documents. According to some embodiments such basic items may be the items which are essential or really needed to perform the document processing service. This allows to reduce the size of information to be processed by the document processing service. Furthermore, this facilitates to optimize the processing service of the documents in terms of I/O load.

According to some embodiments, the predefined set of items comprises text cells including their text content and their bounding boxes, paths including corresponding path information and bitmap resources including their bounding boxes. Parsing and identifying only these items on each of the individual pages of the plurality of documents may provide on the one hand already sufficient information for the respective document processing services, but it may provide on the other hand significant advantages in terms of storage and I/O load efficiency.

Figures 6A, 6B:
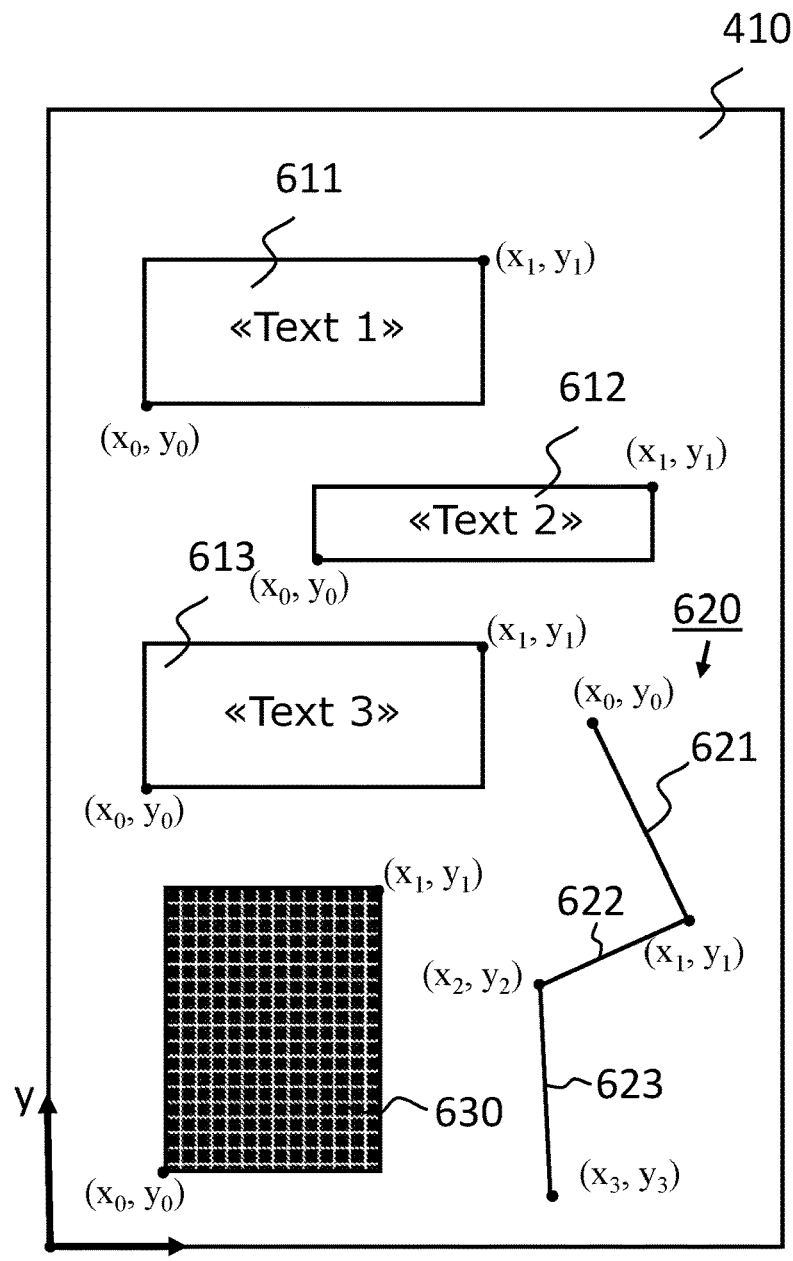

Referring now to FIG. 6a, an individual page 600 of an exemplary document of the first format is shown. According to this example it is assumed that the underlying computer-implemented method parses and identifies in the individual pages of the documents three categories of predefined items, namely text cells, paths and bitmap resources.

In this example the individual page 600 comprises three text cells 611, 612 and 613. The text cell 611 comprises the exemplary text "Text 1" as well as a bounding box defined by the coordinates $(x_0, y_0)$ of the lower left corner and the coordinates $(x_1, y_1)$ of the upper right corner. The coordinates may be defined e.g. with respect to a x-y-coordinate system that has its origin in the lower left corner of the individual page 600. Furthermore, the text cell 612 comprises the exemplary text "Text 2" and the text cell 613 comprises the exemplary text "Text 3". In addition, both text cells 612 and 613 are defined by corresponding bounding boxes defined by the coordinates $(x_0, y_0)$ of the lower left corner and the coordinates $(x_1, y_1)$ of the upper right corner. It should be noted that for ease of illustration the coordinates of the bounding boxes are generally and uniformly denoted as $(x_0, y_0)$ for the lower left corner and $(x_1, y_1)$ for the upper right corner, wherein the variables $x_0, y_0, x_1$ and $y_1$ represent different actual values for the different bounding boxes.

In addition to the text cells the computer-implemented method parses the page 600 for paths and has identified a path 620. The path 620 comprises three straight lines 621, 622 and 623. The straight line 621 is defined by the coordinates $(x_0, y_0)$ and $(x_1, y_1)$ denoting the start point and the end point of the straight line 621, the straight line 622 is defined by the coordinates $(x_1, y_1)$ and $(x_2, y_2)$ denoting the start point and the end point of the straight line 622 and the straight line 623 is defined by the coordinates $(x_2, y_2)$ and $(x_3, y_3)$ denoting the start point and the end point of the straight line 623. According to embodiments, the computer-implemented method may also identify the color and the width of the path 620.

Furthermore, the computer-implemented method parses the page 600 for bitmap resources and has identified in this example a bitmap resource 630. The bitmap resource 630 is defined as a bounding box defined by the coordinates $(x_0, y_0)$ of the lower left corner and the coordinates $(x_1, y_1)$ of the upper right corner.

Referring back to FIG. 4, the computer-implemented method of the flow chart 400 continues with block 460. At block 460 the computer-implemented gathers the predefined set of items that has been identified in the previous block 450 into individual page files of a second format.

Referring back to FIG. 6a, this means the result of the parsing and identification, namely the three text cells 611, 612 and 613, the path 620 and the bitmap resource 630 will be gathered into an individual page file of predefined format, namely a second format. The second format may be in particular a text format. It can generally be freely defined and describes basic information on the identified items in a text format.

FIG. 6b shows an example of an individual page file 650 of the second format that corresponds to the individual page 600 of FIG. 6a. In this example the individual page file 650 comprises five lines 651-655, each comprising textual information about one of the predefined items of FIG. 6a.

Generally, any suitable syntax may be used to define the second format. In this example the string "text cell:" defines that parameters of a text cell are given in subsequent rectangular brackets. The rectangular brackets comprise the position of the lower left and upper right corner of the bonding box of the text cell, each in round brackets, followed by the text in parentheses after the string "text=". Corresponding examples for the text cells 611, 612 and 613 are provided in the lines 651, 652 and 653 respectively.

In addition, the string "path:" defines that parameters of a path are given in subsequent rectangular brackets. The rectangular brackets comprise the positions of the connection points or junctions of the path, followed by the color after the string "color=" and followed by the width of the path after the string "width=".

A corresponding example for the path 620 is provided in the line 654.

In addition, the string "bitmap:" defines that parameters of a bitmap resource are given in subsequent rectangular brackets. The rectangular brackets comprise the position of the lower left and upper right corner of the bonding box of the text cell, each in round brackets. A corresponding example for the bitmap resource 630 is provided in the line 655. It should be noted that the exemplary format given above may comprise a plurality of further or other syntax elements to define the parsed and identified items of the individual page files of the first format. According to embodiments, the Java Script Object Notification Data Interchange Format (JSON-Format) may be used as second format. According to such an embodiment any of the specifications of JSON-Format by Douglas Crockford, e.g. RFC 8259, or any specifications of the JSON-Format by ECMA, e.g. ECMA 404 or any specifications of the JSON-Format by the International Standards Association, e.g. ISO/IEC 21778:2017, may be used. According to another embodiment, the Hypertext Markup Language as developed by the Worldwide Web Consortium and as standardized in particular by ISO/IEC 15445, W3C HTML 5, 3C HTML 4.0, W3C HTML 3.2 or any further versions may be used for the second format. According to yet another embodiment, the YAML Ain't Markup Language (YAML) may be used as second format.

Referring back to FIG. 4, the computer-implemented method of the flow chart 400 continues with block 470. At block 470 the computer-implemented method performs the document processing service with the individual page files of the second format.

Figure 5:
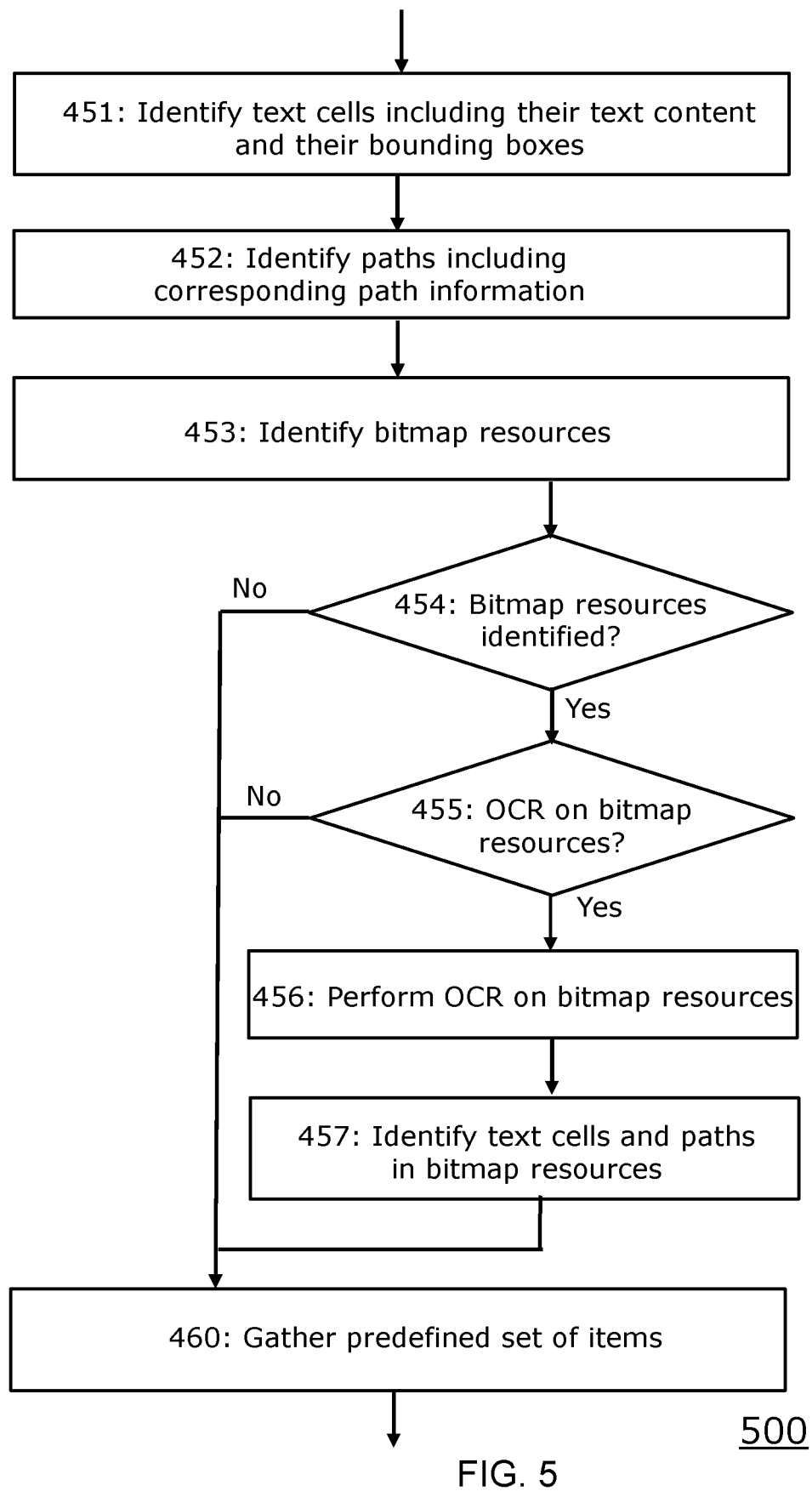
FIG. 5 shows a flow chart of a computer-implemented method for performing a document processing service.

Referring now to FIG. 5, a flow chart 500 of performing a document processing service is shown. More particularly, the flow chart 500 comprise a more detailed embodiment of the parsing and identification block 450 as described with reference to FIG. 4, and denoted with numbers 451ff.

At block 451, the computer-implemented method identifies text cells including their text content and their bounding boxes of the one or more individual pages, e.g. of the page 600 as described above with reference to FIG. 6a.

At block 452, the computer-implemented method identifies paths including corresponding path information such as path coordinates, color information of the color of the path and width information of the width of the paths.

At block 453, the computer-implemented method identifies bitmap resources and their bounding boxes.

The results of such a parsing and identification correspond to the parsing as described above with reference to FIGS. 4, 6a and 6b.

At block 454, the computer-implemented method checks whether any bitmap resources have been identified in the previous block 453. If this is the case, the method continues with block 455. If no bitmap resources have been identified, the method continues with block 460 and gathers the predefined items that have been detected, namely the text cells and the paths, into individual pages files of the second format.

At block 455, the method checks whether an optical character recognition and/or an optical pattern recognition shall be performed according to requirements or the specification or the needs of the document processing service to be subsequently performed. If an OCR shall be performed, the method continues with block 456, otherwise with block 460.

At block 456, the method performs an OCR on the one or more bitmap resources of the individual page files. In particular, at block 457, the computer-implemented method identifies text cells in the bitmap resources including their text content and their bounding boxes as well as paths in the bitmap resources. The latter may include to identify path coordinates, path color and path width.

Then, the method continues with block 460 and gathers the text cells and paths of the individual page files (including the text cells and paths of the identified bitmap resources) into individual pages files of the second format.

An example page as described with reference to FIG. 5 is given in FIGS. 7a and 7b.

Figures 7A, 7B:
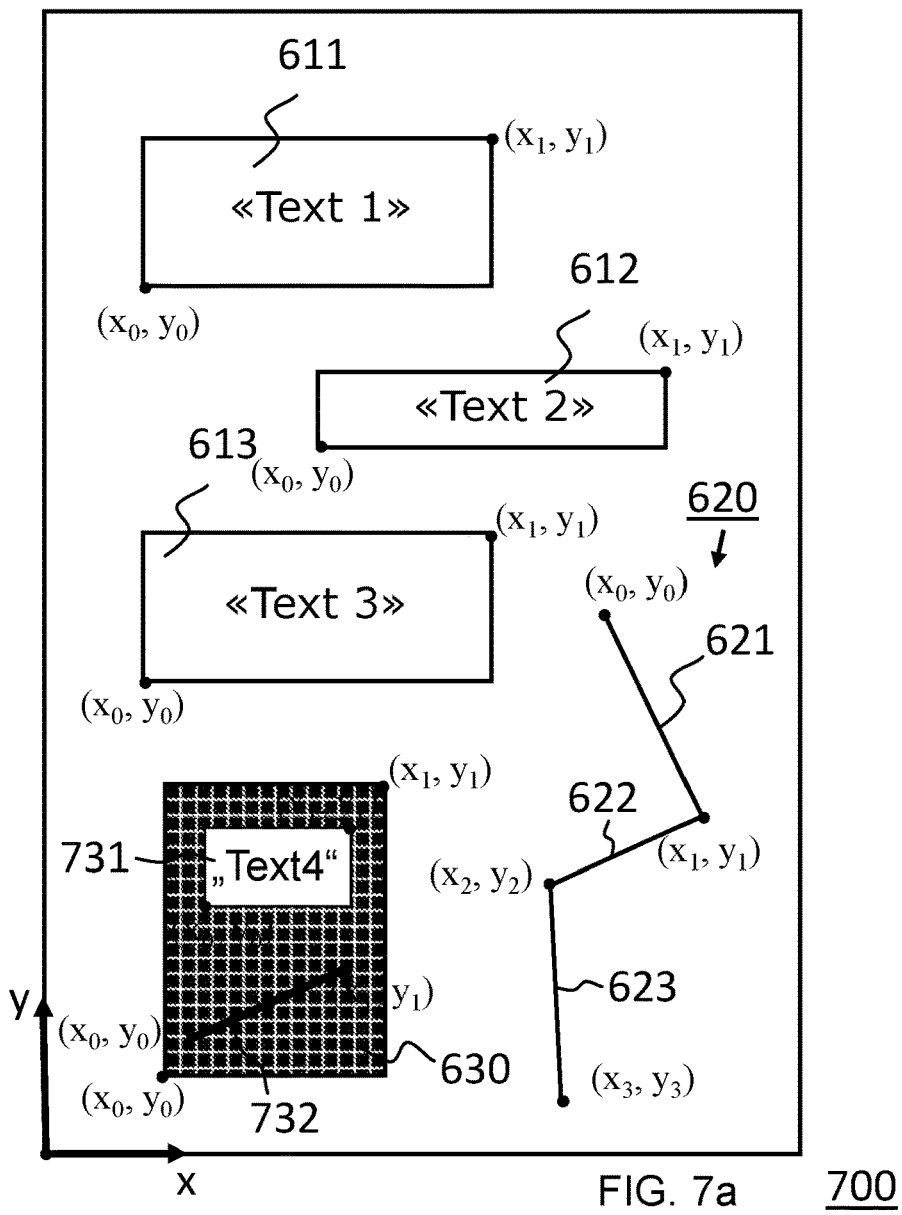

Referring now to FIG. 7a, an individual page 700 of an exemplary document of the first format is shown. The individual page 700 corresponds to the individual page 600 of FIG. 6a and comprises accordingly the three text cells 611, 612 and 613, the path 620 and the bitmap resource 630 as described above with reference to FIG. 6a. In addition to the processing described with reference to FIG. 4 and the associated FIGS. 6a and 6b, the computer-implemented method performs at the block 456 an OCR of the bitmap resource 630 and identifies, at the block 457, a text cell 731 and a path 732 in the bitmap resource 630.

FIG. 7b shows the corresponding individual page file 750 in the second format corresponding to the individual page 700 of FIG. 7a. In this example the individual page file 750 comprises seven lines 751-757, each comprising textual information about one of the predefined items of FIG. 7a. A corresponding example for the text cell 731 is provided in line 756 and for the path 732 in the line 757.

Figures 8A, 8B:
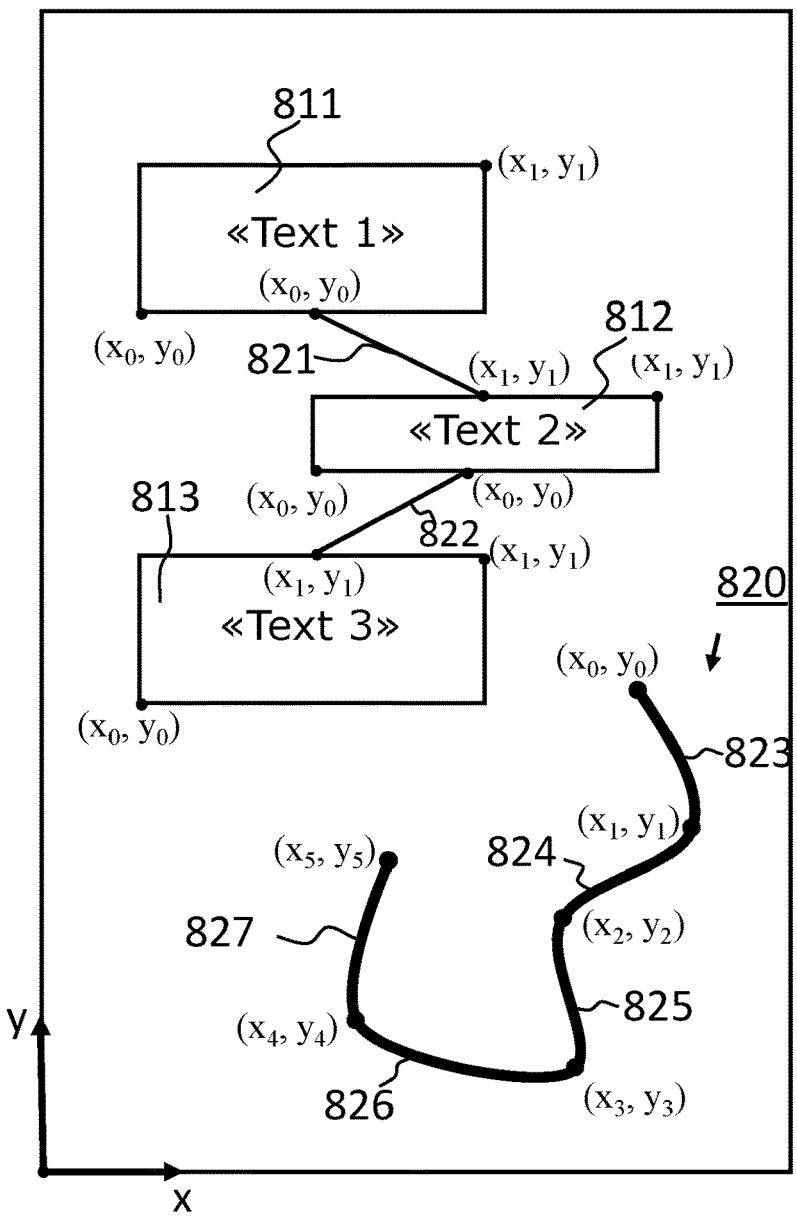

Referring now to FIG. 8a, another individual page 800 of an exemplary document of the first format is shown. The individual page 800 comprises text cells 811, 812 and 813 corresponding to the text cells 611, 612 and 613 as described with reference to FIG. 6a. In addition, it comprises two separate paths 821 and 822 between the text cells 811 and 812 as well as between the text cells 812 and 813.

Furthermore, the page 800 comprises a path 820. The path 820 comprises five curved lines 823, 824, 825, 826 and 827. The path 820 is defined by the coordinates $(x_0, y_0)$, $(x_1, y_1)$, $(x_2, y_2)$, $(x_3, y_3)$, $(x_4, y_4)$ and $(x_5, y_5)$.

FIG. 8b shows the corresponding individual page file 850 in an exemplary second format (text format) comprising lines 851-856. The text cells 811, 812 and 813 are described in the lines 851, 852 and 853 respectively. The paths 821 and 822 are described in the lines 854 and 855 respectively. The path 820 is described in the line 856. According to this example the string "curved path:" defines that parameters of a curved path are given in subsequent rectangular brackets. The rectangular brackets comprise the positions of the connection points or junctions of the curved path, followed by the color after the string "color=" and followed by the width of the path after the string "width=". According to embodiments, further parameters/details to describe the curved path may be provided in the line 856.

Figure 9:
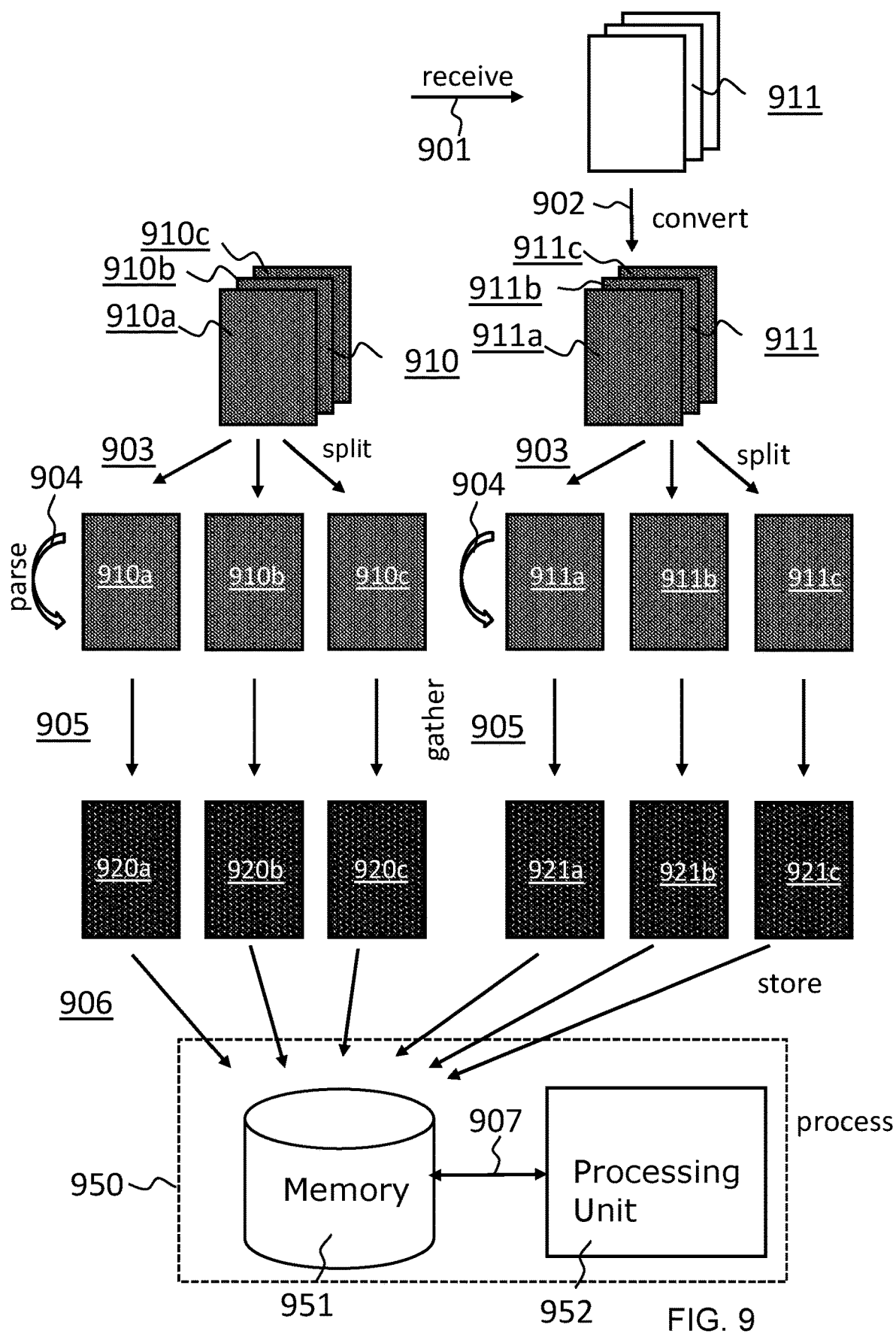
FIG. 9 shows a visual representation of the processing of electronic documents and its corresponding formats according to embodiments of a computer-implemented method of the invention.

FIG. 9 shows a visual representation of the processing of electronic documents and its corresponding formats according to embodiments of a computer-implemented method of the invention.

The computer-implemented method may be performed e.g. by a document processing service 950. The document processing service 950 comprises a memory 951 and a processing unit 952. The document processing service 950 may be performed as a cloud service according to an embodiment. According to embodiments the document processing service may run on a cloud computing node 10 as shown in FIG. 1. In this respect the memory 951 may correspond to the memory 20 of FIG. 1 and the processing unit 952 may correspond to the processing unit 16 of FIG. 1.

At block 901, the document processing service 950 receives a document 910 and a document 911. The document 910 is already received in a first format, wherein the document 911 is in a third format which is different from the first and the second format.

At block 902, the document processing service 950 converts the document 911 of the third format into the first format. This may be done e.g. by standard document format conversion programs. As an example, the third format may be a Microsoft Word format and the first format a PDF-format. The block 902 may then be performed e.g. with the document format conversion program which is integrated in the Microsoft Word program. The third format is graphically represented by the white color of the document 911, while the first format of the documents 910 and 911 is represented by a dotted pattern of density 25%. Each of the documents 910 and 911 comprises a plurality of individual pages, in this example three pages 910*a*, 910*b*, 910*c* and 911*a*, 911*b*, 911*c* respectively.

At a block 903, the document processing service 950 splits the documents 910 and 911 into its individual pages 910*a*, 910*b*, 910*c* and 911*a*, 911*b*, 911*c* respectively.

At a block 904, the document processing service 950 parses the individual pages 910*a*, 910*b*, 910*c*, 911*a*, 911*b* and 911*c* individually, i.e. they are parsed per page or page by page. The parsing comprises in particular identifying a predefined set of items of the one or more individual pages. The predefined set of items may generally comprise any items that are of particular interest for the document processing service to be performed.

At a block 905, the document processing service 950 gathers the predefined set of items which have been identified in the previous block 904 into individual page files. More particularly, the predefined set of items of the individual pages 910*a*, 910*b* and 910*c* are gathered into individual page files 920*a*, 920*b* and 920*c* respectively of a second format. Furthermore, the predefined set of items of the individual pages 911*a*, 911*b* and 911*c* are gathered into individual page files 921*a*, 921*b* and 921*c* respectively of a second format. The second format of the individual page files 920*a*, 920*b*, 920*c*, 921*a*, 921*b* and 921*c* is illustrated by a dotted pattern of density 10%. The lower density shall illustrate the reduction in the corresponding file size.

At a block 906, the document processing service 950 stores the individual pages files 920*a*, 920*b*, 920*c* as well as 921*a*, 921*b* and 921*c* into the memory 951.

At a block 907, the processing unit 952 uses the individual pages files 920*a*, 920*b*, 920*c*, 921*a*, 921*b* and 921*c* stored in the memory 951 for performing processing tasks of the document processing service 950. The processing tasks of the document processing service 950 may encompass in particular ground-truth gathering, machine learning, document-conversion and/or language analysis.

The resulting document processing service may "normalize" or in other words even out both I/O and memory demand between documents of different size. Since the original documents 910 and 911 are split page-by-page into the individual page files 920*a*, 920*b*, 920*c*, 921*a*, 921*b* and 921*c*, the amount of data that needs to be transferred between the memory 951 and the processing unit 952 for every single processing task is only a fraction of the full original documents 910 and 911. Furthermore, by storing only the predefined set of items in the individual page files 920*a*, 920*b*, 920*c*, 921*a*, 921*b* and 921*c* of the second format, the average as well as the median file size can be effectively reduced compared with the original documents 910 and 911.

As an example, the first format may be the PDF-format and the second format the JSON-format. Investigations of the applicant have revealed that the median file size of documents in the JSON-format is approximately 2 times smaller than the file size of programmatic documents in the PDF-format. For scanned PDF-documents, the difference is even bigger and may be more than an order of magnitude.

And as mentioned, while operating on the document data, the advantage of working with the second format, e.g. working e.g. with a parsed JSON-format instead of the PDF-format, may be even higher. More particularly, the I/O-load between micro-services working together in a processing pipeline may be significantly reduced.

The present invention may be embodied as a system, a method, and/or a computer program product. The computer program product may include a computer readable storage medium (or media) having computer readable program instructions thereon for causing e.g. the processing unit 16 of the server 12 of FIG. 1 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
providing a plurality of documents in either a first format or in a third format that is other than the first format;
separating each of the plurality of documents into individual pages, and creating a plurality of files, each file storing one individual page;
individually parsing each individual page of the plurality of documents, the parsing comprising identifying any of a predefined set of items on individual page, wherein the predefined set of items comprises text cells including their text content and bounding boxes, bitmap resources and their bounding boxes, and straight paths and curved paths;
creating a page file of a second format for each individual page, wherein the page file comprises an entry for each one of the identified predefined items, each entry including a label of a type of the predefined item, a beginning and an ending x-y coordinate pair locating the predefined item on the individual page, contents of the identified predefined item, a path segment connecting each identified predefined item to a next identified predefined item by the beginning and the ending x-y coordinate pair, and a curved path between a first identified predefined item and a last identified predefined item, wherein the curved path is a continuous curve formed from connecting the beginning and the ending x-y coordinate pairs of each path segment;

storing only the entry for each identified predefined item in the individual page file of the second format; and sending the individual page file to a document processing service.

2. The method according to claim 1, wherein straight paths comprise an x-y coordinate pair, wherein an origin coordinate begins in a lower left corner of the individual page and an end coordinate ends in an upper right corner of the induvial page.

3. The method according to claim 2, wherein a curved path comprises a number of straight line segments, each having the x-y coordinate pair, wherein connecting the straight line segments forms the curved path.

4. The method according to claim 1, further comprising:
performing an optical character recognition on bitmap resources;
identifying text cells including their text content and their bounding boxes in the bitmap resources; and
identifying paths including corresponding path information in the bitmap resources, the path information comprising path coordinates.

5. The method according to claim 4, wherein the path information comprises color information of a color of a path and width information of a width of the path.

6. The method according to claim 1, wherein the first format is a cross-platform software format.

7. The method according to claim 1, wherein the second format is a text format comprising textual information of a predefined structure.

8. The method according to claim 1, wherein the document processing service is embodied as micro-service.

9. The method according to claim 1, wherein the second format is configured to provide a reduction of an average and a median file size of the plurality of documents compared with the first format.

10. The method according to claim 1, wherein the predefined set of items is selected in dependence on the document processing service.

11. The method according to claim 1, wherein the computer-implemented method is provided as a service in a cloud environment.

12. A computing system, comprising:
one or more processors for executing computer-readable instructions, the computer-readable instructions controlling the one or more processors to perform operations comprising:
receiving a plurality of documents in either a first format, or in a third format that is other than the first format;
separating each of the plurality of documents into individual pages, and creating a plurality of files, each file storing one individual page;
individually parsing each individual page of the plurality of documents, the parsing comprising identifying any of a predefined set of items on individual page, wherein the predefined set of items comprises text cells including their text content and bounding boxes, bitmap resources and their bounding boxes, and straight paths and curved paths;
creating a page file of a second format for each individual page, wherein the page file comprises an entry for each one of the identified predefined items, each entry including a label of a type of the predefined item, a beginning and an ending x-y coordinate pair locating the predefined item on the individual page, contents of the identified predefined item, a path segment connecting each identified predefined item to a next identified predefined item by the beginning and the ending x-y coordinate pair, and a curved path between a first identified predefined item and a last identified predefined item, wherein the curved path is a continuous curve formed from connecting the beginning and the ending x-y coordinate pairs of each path segment;
storing only the entry for each identified predefined item in the individual page file of the second format; and
sending the individual page file to a document processing service.

13. A computer program product comprising a computer-readable storage medium having program instructions embodied therewith, the program instructions executable by a processor to cause the processor to perform operations comprising:
receiving a plurality of documents in either a first format, or in a third format that is other than the first format;
separating each of the plurality of documents into individual pages, and creating a plurality of files, each file storing one individual page;
individually parsing each individual page of the plurality of documents, the parsing comprising identifying any of a predefined set of items on individual page, wherein the predefined set of items comprises text cells including their text content and bounding boxes, bitmap resources and their bounding boxes, and straight paths and curved paths;
creating a page file of a second format for each individual page, wherein the page file comprises an entry for each one of the identified predefined items, each entry including a label of a type of the predefined item, a beginning and an ending x-y coordinate pair locating the predefined item on the individual page, contents of the identified predefined item, a path segment connecting each identified predefined item to a next identified predefined item by the beginning and the ending x-y coordinate pair, and a curved path between a first identified predefined item and a last identified predefined item, wherein the curved path is a continuous curve formed from connecting the beginning and the ending x-y coordinate pairs of each path segment;
storing only the entry for each identified predefined item in the individual page file of the second format; and
sending the individual page file to a document processing service.

14. A server comprising:
one or more processors for executing computer-readable instructions, the computer-readable instructions controlling the one or more processors to perform operations comprising:
separating each of a plurality of documents into individual pages, and creating a plurality of files, each file storing one individual page;
individually parsing each individual page of the plurality of documents, the parsing comprising identifying any of a predefined set of items on individual page, wherein the predefined set of items comprises text cells including their text content and bounding boxes, bitmap resources and their bounding boxes, and straight paths and curved paths;

creating a page file of a second format for each individual page, wherein the page file comprises an entry for each one of the identified predefined items, each entry including a label of a type of the predefined item, a beginning and an ending x-y coordinate pair locating the predefined item on the individual page, contents of the identified predefined item, a path segment connecting each identified predefined item to a next identified predefined item by the beginning and the ending x-y coordinate pair, and a curved path between a first identified predefined item and a last identified predefined item, wherein the curved path is a continuous curve formed from connecting the beginning and the ending x-y coordinate pairs of each path segment;

storing only the entry for each identified predefined item in the individual page file of the second format; and sending the individual page file to a document processing service.

15. The computer program product according to claim 13, wherein:
- straight paths comprise an x-y coordinate pair, wherein an origin coordinate begins in a lower left corner of the individual page and an end coordinate ends in an upper right corner of the induvial page;
- wherein a curved path comprises a number of straight line segments, each having an x-y coordinate pair, wherein connecting the straight line segments forms the curved path; and
- wherein a text cell comprises a box delimited by a pair of x-y coordinates.

16. The computer program product of claim 13, wherein the individual page files of the second format include individual entries for each of the predefined set of items, the individual entries comprising: an identifier corresponding to a type of item, a position of a lower left and upper right corner of the bounding box of the type of item, content of the bounding box wherein the type of item is text, and a color identifier and a width identifier wherein the type of item is path.

* * * * *